J. H. DWORK.
RESILIENT WHEEL.
APPLICATION FILED SEPT. 10, 1917.

1,283,119.

Patented Oct. 29, 1918.

Witness
Edwin L. Bradford

Inventor
Joseph H. Dwork
By Wm. E. Dyre
Attorney

UNITED STATES PATENT OFFICE.

JOSEPH H. DWORK, OF NEWARK, NEW JERSEY.

RESILIENT WHEEL.

1,283,119.  Specification of Letters Patent.  Patented Oct. 29, 1918.

Application filed September 10, 1917. Serial No. 190,598.

*To all whom it may concern:*

Be it known that I, JOSEPH H. DWORK, a citizen of the United States, residing at Newark, in the county of Essex and State of New Jersey, have invented certain new and useful Improvements in Resilient Wheels; and I do hereby declare the following to be a full, clear, and exact description of the invention, such as will enable others skilled in the art to which it appertains to make and use the same.

My present invention relates to resilient tires and wheels, but has reference more particularly to a novel combination and arrangement of spring wheel and cushion tire for use upon vehicles generally, but more especially for use upon automobiles.

The invention has for an object the production of wheels of great simplicity, durability, and efficiency, wheels in which the constituent parts are easily assembled and readily accessible for purposes of repair or substitution.

The invention will be hereinafter particularly described and then pointed out in the claims following.

In the accompanying drawings which form part of this application for Letters Patent, and whereon like reference characters indicate corresponding parts in the several views.

Figure 1:
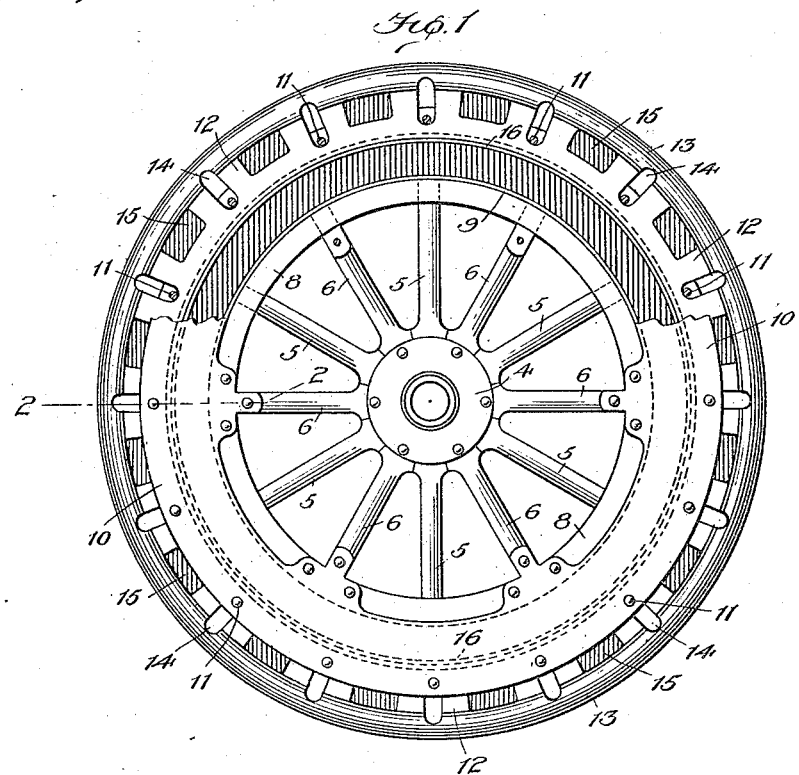
Figure 1 is a side elevation of my invention, having the upper portion of one side plate broken away exposing to view structural parts beneath.
Figure 2:
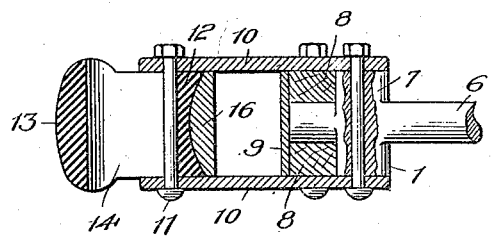
Fig. 2 is a transverse sectional view through the wheel and tire taken on the line 2—2, Fig. 1.

Reference being had to the drawings and numerals thereon, 4 indicates a wheel hub of ordinary construction, from which radiate spokes 5 also of ordinary construction, and intermediate spokes 6 the latter having lateral extensions 7 near their outer ends, as shown by Fig. 2. All of the said spokes 5 as well as 6 are tenoned into a surrounding felly 8 preferably of wood, bounded by an ordinary endless steel band 9. To the lateral extensions or ends 7 of said intermediate spokes 6 are securely bolted, at both sides of the structure annular sheet metal flanges or plates 10, 10 in parallel arrangement the same being connected near their outer peripheries by a series of through bolts 11, and extending considerably above the felly 8. These flanges 10, 10 are secured to said lateral spoke extensions by means of radial lugs formed integral with said flanges and projecting beyond the same as shown, to receive the fastening bolts.

Mounted between the outer edges of flange plates 10, 10 is a unitary cushion tire 12 preferably of vulcanized rubber having an enlarged tread surface 13, a series of elongated openings 14 radially arranged, through each of which passes loosely one of the aforesaid bolts 11, and intermediate of these lateral openings 14 the tire is further provided with a corresponding series of side pockets or depressions 15 for the purpose of added resiliency.

Figure 3:
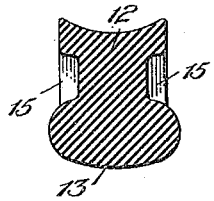
Fig. 3 is also a transverse section through the tire only.

The inner surface of the tire 12 is by preference, although not necessarily, slightly concave as best shown by Fig. 3, and immediately inside of this within the confines of plates 10, 10 is located an endless circular steel spring 16, by preference having an outer convex surface as best shown by Fig. 2.

The foregoing being a description of my invention in its best form of construction at present known to me, what I now claim and desire to secure by Letters Patent is:

1. In a resilient wheel the combination with a suitable hub and felly, of spokes having lateral extensions near their outer ends, oppositely disposed annular flanges bolted to the wheel felly and having radial lugs secured to said lateral spoke extensions, and a resilient tire mounted in the channel formed by said flanges.

2. A resilient tire for vehicles having a convex outer and a concave inner periphery, a circumferential series of equidistant radially arranged elongated openings therethrough, and a corresponding series of pockets in the sides of the tire alternating with the openings aforesaid.

3. A resilient tire for vehicles having a convex outer and a concave inner periphery, a circumferential series of equidistant radially arranged elongated openings therethrough, a corresponding series of pockets in the sides of the tire alternating with the openings aforesaid, and a circumferential spring having a convex outer periphery arranged and adapted to fit the concave inner periphery of the tire.

In testimony whereof I affix my signature, in presence of two subscribing witnesses.

JOSEPH H. DWORK.

Witnesses:
  LOUIS ROGINS,
  ISIDOR SIMON.

Copies of this patent may be obtained for five cents each, by addressing the "Commissioner of Patents, Washington, D. C."